Nov. 21, 1961  D. G. SLOVIN  3,009,765
METHOD OF MAKING POLYURETHANE FILAMENTARY MATERIAL
Filed Feb. 20, 1959
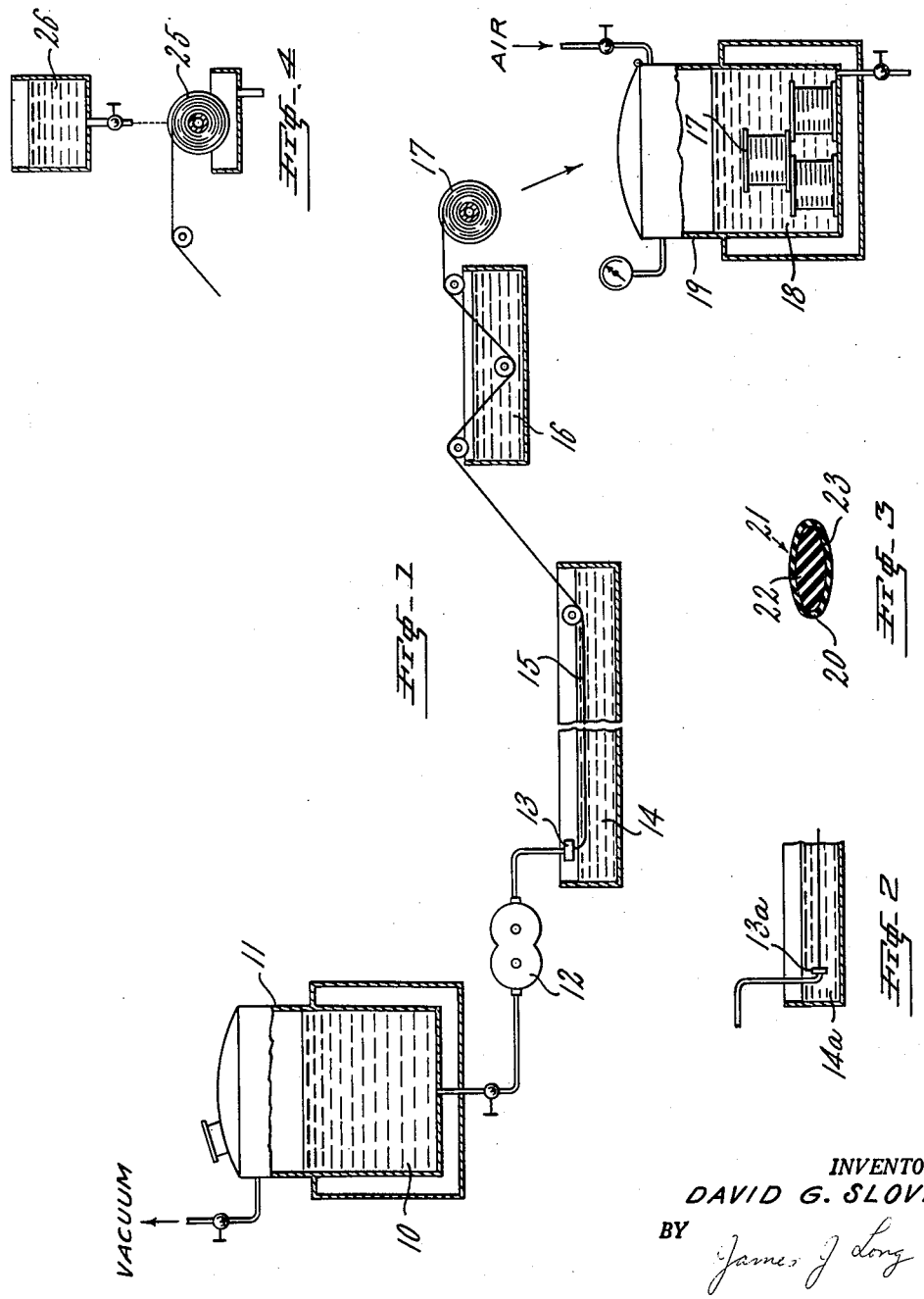
INVENTOR.
DAVID G. SLOVIN
BY
AGENT

3,009,765
METHOD OF MAKING POLYURETHANE FILAMENTARY MATERIAL

David G. Slovin, Cranston, R.I., assignor to United States Rubber Company, New York, N.Y., a corporation of New Jersey
Filed Feb. 20, 1959, Ser. No. 794,727
8 Claims. (Cl. 18—54)

This invention relates to a method of making filamentary material, and more particularly it relates to the production of a polyurethane thread or filament having improved resistance to cracking.

In commonly assigned copending application Serial No. 756,420 of Kohrn, Slovin and Bliven, filed August 21, 1958, and now Patent No. 2,953,839, there is described and claimed a method of making a polyurethane thread or the like, involving extruding a stream of liquid polyurethane prepolymer into a bath containing an aqueous solution of an aliphatic diprimary diamine to effect an initial setting of the extruded material, and thereafter curing the extruded material by the action of water.

It has been observed that from time to time there may be a tendency for the thread made in the foregoing manner to display cracks on the surface.

I have now found, unexpectedly, that any such tendency to form cracks on the surface of the thread can be forestalled by treating the thread, subsequent to removal from the aliphatic diprimary diamine bath, and prior to the water cure, in such a manner as to remove or neutralize any residual primary aliphatic diamine on the surface of the thread.

The manner in which the invention is practiced will be described in detail with reference to the accompanying drawing, wherein:

FIG. 1 illustrates, in purely diagrammatic fashion, one method of carrying out the invention;

FIG. 2 is a fragmentary view of a modified arrangement of a nozzle in a setting bath;

FIG. 3 is a cross-sectional view of a thread made in accordance with the invention; and FIG. 4 is a fragmentary view of a modified arrangement for treating the thread.

The disclosure of previously mentioned application Serial No. 756,420 is hereby incorporated herein by reference, as explaining in full detail the materials used in the basic process, and the manner of practicing the basic process, upon which the present invention is an improvement. In the basic process a liquid prepolymer, which is a reaction product of a polymer having terminal alcoholic hydroxyl groups with an aromatic diisocyanate, is forced through a fine nozzle into a solution comprising a diprimary diamine, which effects a rapid setting of the surface of the liquid prepolymer, so that it may be handled as a thread. This thread, which is actually a fluid core surrounded by a solid skin, is subsequently cured with water in a manner to be described in detail below, to obtain a completely solid, strong, elastic thread having an unusual combination of desirable physical and chemical properties.

The liquid polyurethane prepolymer employed is typically derived from a polymer of molecular weight from 300 to 5000 having terminal hydroxyl groups. Such polymer may be a chain extended polyester made from a glycol, preferably a mixture of ethylene and propylene glycols, and a saturated organic dicarboxylic acid, preferably adipic acid. Usually the glycol contains from 4 to 20 carbon atoms, and the acid contains from 4 to 20 carbon atoms. An excess of the glycol over the acid is used in preparing the polyester, so that the resulting polyester contains terminal hydroxyl groups. Usually such an amount of glycol is used as to give a polyester having a hydroxyl number of 20 to 225, and preferably 36 to 75, and a low acid value less than 6 and preferably less than 1. The molecular weight of the polyester usually ranges from 500 to 5,000 and preferably from 1500 to 3000. In general, the most suitable polyesters are chiefly linear in type with melting point levels of 90° C. or lower.

Other examples of suitable polyesters for use in preparing the prepolymer are polyethylene adipate, polyethylene adipate-phthalate, polyneopentyl sebacate, etc. If desired, small amounts of tri-alcohols such as trimethylolpropane or trimethylolethane may be included in the preparation of the glycol-dicarboxylic acid polyester, and such modified forms of polyester are included within the term polyester as used herein.

As an alternative to the polyesters just described there may be used (for reaction with the polyisocyanate) one or more members of the class of elastomer-yielding polyethers. Such polyethers are typically anhydrous chain-extended polyethers possessing ether linkages (—O—) separated by hydrocarbon chains either alkyl or aryl in nature. The ether should also contain terminal groups reactive to isocyanate, such as alcoholic hydroxyl groups. Such polyether may be linear, or it may be branched. Usually the polyethers used are chiefly linear in type with melting point levels of 90° C. or lower. The molecular weight may range from 500 to 5,000 (i.e., hydroxyl number of about 225 to 22), but is preferably within the range of 750 to 3,500 (i.e., hydroxyl number of about 150 to 45). Preferred polyethers may be represented by the formula $H(OR)_nOH$ where R is a lower (2–6 carbon atoms) alkylene group and $n$ is an integer such that the molecular weight falls within the range specified. Examples of polyethers used are polyethylene glycol, polypropylene glycol, polypropylene-ethylene glycol, and polytetramethylene glycol.

Polyethers not only can be used in place of the polyester but can be used in conjunction with the polyester either as an added reagent or as an intimate part of the polyester molecule thus forming a poly-ether-ester. Examples of such poly-ether-esters are poly diethylene glycol adipate and poly triethylene glycol adipate. The expressions "polyester" or "polyether" as used herein therefore include poly-ether-esters (whether the ethers and esters are physically mixed, or chemically combined), as equivalents of the polyesters or polyethers.

Further examples of polyesters or polyethers suitable for forming prepolymers useful in the invention are the polyesters and polyethers mentioned in U.S. Patents 2,606,162, Coffey, August 5, 1952; 2,801,990, Seeger, August 6, 1958; 2,801,648, Anderson, August 6, 1957; and 2,814,606, Stilmar, November 26, 1957. It is desired to emphasize that the invention contemplates the use of any and all such known polyethers or polyesters (including the poly-ether-esters) suitable for reaction with an aromatic diisocyanate to yield a polyurethane prepolymer capable of being cured to an elastomeric state by the action of water.

The polyester or polyether (including poly-ether-ester) is, as indicated, reacted with an aromatic diisocyanate, such as p,p'-diphenylmethane diisocyanate or toluene diisocyanate, using a considerable molar excess, commonly from a 20% to a 250% and preferably from a 50% to a 150% molar excess, of the aromatic diisocyanate over that amount which would be required to react with all of the alcoholic hydroxyl groups furnished by the polyester. The reaction is frequently effected by mixing the polyester and the aromatic diisocyanate under anhydrous conditions either at room temperature, or at a moderately elevated temperature, e.g., 70–150° C., to form a soluble (in methyl ethyl ketone), uncured, liquid prepolymer which is an essentially linear polyurethane having terminal isocyanate groups.

Representative of the aromatic diisocyanates that may be mentioned, by way of non-limiting examples, are such materials as m- and p-phenylene diisocyanate, toluene diisocyanate, p,p'-diphenyl diisocyanate and 1,5-naphthalene diisocyanate, and in this category we include the aromatic-aliphatic diisocyanates such as p,p'-diphenylmethane diisocyanate. Many other aromatic diisocyanates suitable for reaction with polyesters or the like to yield polyurethane prepolymers capable of being cured to the elastomeric state are disclosed in the prior art (such as the patents referred to previously), and it is desired to emphasize that the invention embraces the use of any and all such aromatic diisocyanates.

As indicated, the process involves conversion of the liquid polyurethane prepolymer into a solid thread by first extruding the liquid in a fine stream, and thereafter converting such liquid stream into a solid thread by a two-stage curing process. First, the outside surface only of the extruded stream of liquid prepolymer is set or cured by the action of a diprimary diamine on such liquid stream. There is thus produced initially a composite thread-like body having a fluid core of uncured prepolymer, and an outer skin or encasing shell of prepolymer that has been set or cured to a solid state by the action of the diprimary diamine. Thereafter, in accordance with the invention the action of diprimary diamine on the surface of the thread is halted or arrested, typically by removing the diamine, preferably by neutralizing it. Subsequently, the thread is subjected to the action of water, preferably under pressure, which causes the liquid core or central portion of the thread to be cured to a solid state also. The cured thread of the invention is therefore characterized by the fact that the bulk of the thread is cured by water, and the thread may be regarded as having two distinct areas in cross-section, the outer portion being essentially a diprimary diamine cured surface, and the interior of the thread being a water cured material.

The initial setting bath comprises an aqueous solution of an aliphatic diamine, such as ethylene diamine or hexamethylene diamine. The aqueous diamine solution used as the setting bath may contain, for example, from 0.5% to 20% of the diamine, and it may be employed at ordinary ambient temperatures, or heated to an elevated temperature (e.g., 100° F., up to, for example, 200° F.). Preferably the setting bath is operated at a temperature of from 110° to 160° F., depending on the thickness of the extruded filament. With small filaments of about 150 size (i.e., 150 to the inch), setting bath temperatures of about 110°–120° F. are most suitable. For larger filaments of about 75 size, temperatures of about 140°–160° F. are most suitable. The surface of the liquid prepolymer stream, as it emerges from the extruding nozzle and passes into the bath, is quickly converted into a solid condition, thus forming an encasement or skin for the central fluid portion of the stream.

The amines most suitable for this purpose are diprimary diamines that may be represented by the general formula $NH_2$—A—$NH_2$, where A is a divalent organic radical in which the terminal atoms are carbon, and which is preferably devoid of groups reactive with isocyanate, that is, the two primary amino groups are preferably the sole groups in the molecule that will react with the isocyanate groups of the polyesterdiisocyanate, to provide the desired curing action. In the preferred diprimary diamines employed in the invention the two primary amino groups are linked by a divalent aliphatic hydrocarbon radical, as in ethylene diamine, hexamethylenediamine, 1,4-diaminocyclohexane, etc. However, the connecting radical between the two essential primary amino groups need not be purely a hydrocarbon, but may contain other atoms in addition to carbon and hydrogen, as in 3,3'-diaminodipropyl ether, and diamino dibutyl sulfide. The amine should be at least slightly soluble in water.

Preferably, there is included in the setting bath a small amount (typically about ½%, although the amount is not critical) of a wetting agent. This is frequently found to be useful in insuring complete and uniform setting of the entire surface of the extruded filament. In general, any known wetting agents of the nonionic or anionic type are suitable for this purpose (such as those disclosed, for example, in Sisley and Wood, "Encyclopedia of Surface Active Agents"), and among the more effective wetting agents there may be mentioned the sodium salts of products obtained by sulfation of higher fatty alcohols (e.g., sodium oleyl sulfonate). The anionic wetting agents are preferred.

The filament thus formed, having a solid skin and a fluid core, is passed through the setting bath for a short distance and is thereafter treated in such manner as to halt further action of the residual diamine on the surface of the thread. For this purpose a material of acidic action is applied to the thread to neutralize the diamine. Thus, the thread may be passed into an acid bath, or acid may be sprayed or dripped onto the thread. Such acid may be inorganic, such as hydrochloric acid, or organic, such as a monocarboxylic acid, e.g., formic acid, acetic acid, benzoic acid, etc., or a polycarboxy acid, such as succinic acid, oxalic acid, phthalic acid, etc. Preferably the acid is a weak acid, i.e. one having an ionization constant of $1.0 \times 10^{-3}$ or less. Volatile acids are preferred. The acid is suitably employed in dilute form, preferably in the form of an aqueous solution of from about 1 to 15 weight-percent concentration. The effect of the acid is to neutralize the diamine remaining on the surface of the thread, and it has most surprisingly been found that the thus-treated thread does not tend to develop objectionable surface cracking, even if a relatively long period of time elapses between the initial diamine setting and the final water cure.

If acids which would tenderize textiles are used, such as hydrochloric acid, the thread should be washed to remove any remaining acid. With the preferred weak organic acids, such washing is not essential, especially if the acid is volatile.

After the acid treatment, the thread is ready for curing of the core. The best properties are obtained when the core is cured by submerging the thread in water at controlled temperature and preferably under pressure. The thread is subjected to the action of water at a temperature of 100–160° F., and preferably about 130–145° F., and is typically under a pressure of at least 50–150 pounds per square inch, preferably about 80–100 pounds per square inch. Under these conditions the water diffuses through the solid surface skin into the fluid core, where it reacts chemically with the available isocyanate groups of the prepolymer, thus bringing about a cure of the core. The rate of cure increases as the temperature increases, and therefore the curing can be accomplished in a short time under the conditions stated (varying, for example, from ¼ hour to 8 hours, preferably ½ hour to 4 hours, depending on the temperature of the water, the thickness of the thread, the size of the spool, the exact composition of the polymer, etc.).

The following examples will serve to illustrate the practice of the invention in more detail (all parts being expressed by weight):

*Example I*

A polyester was prepared from the following ingredients:

|  | Moles | Parts |
| --- | --- | --- |
| Ethylene glycol | 0.98 | 0.253 |
| Propylene glycol | 0.42 | 0.132 |
| Adipic acid | 1.00 | 0.615 |

The mixture was heated at 220–230° C., while subjecting to vacuum to remove the water of esterification and a certain amount of the unreacted glycol. The extent of the vacuum stripping determined the molecular weight of the polyester, as calculated from the acid number and the hydroxyl number. The polyester used in this example had a molecular weight of about 1900, a hydroxyl number of about 58 and an acid number of about 1.0.

The foregoing polyester resin was mixed at a temperature of 85° C. for 1 hour with an excess of p,p'-diphenylmethane diisocyanate in the proportion of 100 parts by weight of the polyester to 29.7 parts of the diisocyanate. A reaction occurred between the hydroxyl groups of the polyester and the isocyanate groups to form a polyurethane intermediate characterized by the presence of unreacted isocyanate groups. This intermediate was a liquid which was soluble in the common organic solvents such as acetone. Referring to FIG. 1 of the drawing, a quantity of the liquid 10 was placed in a supply tank 11 connected to a pump 12, which in turn led to a nozzle 13 suspended just above the surface of an aqueous solution 14 containing 5% ethylene diamine and 0.5% of a non-ionic wetting agent, sodium lauryl sulfate ("Duponol D" supplied by Du Pont). (If desired, the nozzle 13a may be immersed below the surface of the setting bath 14a as shown in FIG. 2.) The diameter of the opening in the nozzle was 0.03". The pump delivered 1 cc. of the prepolymer per minute through the nozzle into the setting bath, which was maintained in this case at a temperature of 130° F.

The surface of the extruded liquid set to a solid condition almost immediately in the setting bath, and the resulting thread 15 (which still had a fluid core) was conveyed through the bath for a distance of about 8 feet at a speed of about eighty feet per minute. The thread then passed out of the bath and thereafter it was passed through a bath 16, containing a 4% aqueous solution of acetic acid. This served to neutralize the diamine remaining on the surface of the thread. The thread was wound up on a reel 17 at a speed of about 140 feet per minute. The reel was immersed in water 18 in an enclosed tank 19, and air pressure was applied in the upper portion of the tank above the surface of the water, at ninety pounds per square inch. The water was heated to 130° F. for a period of forty-five minutes. The fluid core of the thread thereby became substantially completely cured. The diameter of the thread was 0.0065 inch. Outer skin or layer 20 (FIG. 3) of the finished thread 21 is a polyurethane material that has been cured essentially by chemical reaction with a rapid curing agent, viz., a diprimary diamine, while the central area or core 22 is a polyurethane material that has been cured essentially by chemical reaction with water. Although these two more or less concentric zones of the thread cross-section are shown in FIG. 3 as having a definite line of separation 23, it will be understood that in practice there may be an intermediate zone, located between the outer diprimary diamine cured skin and the inner water cured core, which intermediate zone is cured in part by diamine and in part by water.

Alternatively, the thread may be led directly from the setting bath 14, onto a reel 25 (FIG. 4), over which is disposed a supply tank 26 of 4% aqueous acetic acid, from which the acid is allowed to drip onto the spool, thus neutralizing the diamine on the thread surface.

This example may be repeated, using other acids, such as a 12% aqueous solution of succinic acid.

The unique characteristic of the thread made in this manner is that there is no tendency to formation of surface cracks, even though a substantial time may elapse between the initial setting and the final cure. If the acid wash is omitted, and if appreciable time elapses between the initial setting and the final cure, cracks tend to develop. It appears that such cracking is due to continued action of residual diamine on the surface of the thread, leading to a condition in which the surface of the thread has poor properties. The invention obviates this by in effect removing the diamine immediately after the initial setting.

*Example II*

A prepolymer is prepared essentially as in Example I, using two moles of methylene diisocyanate ("Nacconate 300" supplied by National Aniline) and one mole of diethylene glycol adipate ("Multron R–16" supplied by Mobay Chemical Co., viscosity 600–800 cps. at 163° F., density 1.19 at 77° F., acid number less than 2, hydroxyl number 36–40). The resulting polymer is then extruded into a water solution containing 3% of ethylene diamine and ½% of a wetting agent (e.g., "Duponol D" supplied by Du Pont, sodium salt of lauryl [or similar higher fatty alcohol] sulfate). Thereafter the thread is washed in a 4% acetic acid solution. The thread is cured 2 hours at 140° F. and 90 p.s.i. under water. There is no tendency to develop surface cracks.

*Example III*

Prepolymer is prepared as described in Example I. The prepolymer is extruded into an aqueous bath of 5% propylene diamine and ½% "Duponol D" maintained at 130° F. The thread is taken up at 66 feet per minute and washed in 4% aqueous acetic acid. The thread is cured 2 hours at 140° F. and 70 p.s.i. under water. It has good physical properties and does not crack.

The prepolymer is similarly extruded into a bath containing 5% of 1,3-diamino-propane washed in the acetic acid bath, and similarly cured at 140° F. with equivalent results. Similarly, a bath of 5% of 1,6-hexane-diamine is used followed by the wash in acetic acid with similar results after cure at 190° F.

Having thus described my invention, what I claim and desire to protect by Letters Patent is:

1. A method of making a filamentary material comprising in combination the steps of providing a liquid polyurethane prepolymer which is a reaction product of a polymer having terminal hydroxyl groups selected from the group consisting of polyesters and polyethers with an excess of an aromatic diisocyanate, extruding a stream of said liquid prepolymer into an aqueous aliphatic diprimary diamine bath to effect an initial setting of the extruded material, washing the extruded material with acid to remove said diamine from the surface thereof, and thereafter curing the extruded material by the action of water.

2. A method of making a filamentary material comprising in combination the steps of providing a liquid polyurethane prepolymer which is a reaction product of a polymer having terminal alcoholic hydroxyl groups selected from the group consisting of polyesters and polyethers, with a 20% to a 250% molar excess of an aromatic diisocyanate, extruding a stream of said liquid, passing said extruded stream into a setting bath comprising a 0.5% to a 20% aqueous solution of an aliphatic diprimary diamine maintained at a temperature of from 100° to 200° F., whereby the surface of the extruded stream is cured to a solid state by the action of said diamine, the interior of the stream remaining in a fluid condition, washing the surface of the said surface-cured extruded stream with a weak acid, to neutralize any of said diamine remaining on such surface and thereafter submerging the said surface-cured extruded stream in water at a temperature of from 100° to 160° F. whereby the interior of the extruded stream is cured to a solid state by the action of the water.

3. A method of making an elastic thread comprising in combination the steps of providing a liquid polyurethane prepolymer which is a reaction product of a polyester having terminal alcoholic hydroxyl groups, a hydroxyl number of 36 to 75, an acid value less than 1, and a molecular weight of 1500 to 3000, with a 50% to 150% molar excess of an aromatic diisocyanate, extruding said prepolymer in the form of a filament, thereafter passing said filament into a setting bath comprising a 0.5 to 20% aqueous solution of an aliphatic diprimary diamine maintained at a temperature of from 100° to 160° F., whereby the surface of the filament is cured to a solid state, while the interior of the filament remains fluid, washing the filament in a dilute aqueous solution of volatile organic acid to neutralize unreacted aliphatic diprimary diamine on said surface, winding the filament upon a spool, and immersing the wound filament in water at a temperature of 100° to 160° F. under a pressure of about 50 to 150 pounds per square inch, whereby the interior of the filament is cured to a solid, non-porous state by the action of the water.

4. A method as in claim 3 in which the said polyester is ethylene-propylene adipate.

5. A method as in claim 3 in which the said diisocyanate is p,p'-diphenylmethane diisocyanate.

6. A method as in claim 3 in which the said diamine is ethylene diamine.

7. A method as in claim 6, in which the said polyester is ethylene-propylene adipate, and the said diisocyanate is p,p'-diphenylmethane diisocyanate.

8. A method of making an elastomeric thread comprising in combination the steps of providing a liquid prepolymer which is a reaction product of ethylene propylene adipate and p,p'-diphenylmethane diisocyanate, said prepolymer being devoid of catalyst, extruding the prepolymer in a liquid state through a nozzle and into a setting bath maintained at a temperature of about 130° F., the said bath being comprised of an aqueous solution containing about 5% ethylene diamine and about 0.5% of an anionic wetting agent, whereby the extruded stream of liquid prepolymer is set in the form of a solid thread, withdrawing the thread from the bath, winding the thread up into a package, washing the thread with 4 weight-percent aqueous acetic acid to neutralize any ethylene diamine remaining thereon, immersing the package in water, and heating the water to a temperature of about 130°–145° F. for a period of from 30 min. to 2 hours while maintaining a pressure of about 80–100 pounds per square inch, whereby the thread becomes cured to an elastomeric state characterized by tensile strength and elongation at break greater than 2500 p.s.i. and 500%, respectively.

References Cited in the file of this patent

UNITED STATES PATENTS

| | | |
|---|---|---|
| 2,650,212 | Windemuth | Aug. 25, 1953 |
| 2,657,151 | Gensel | Oct. 27, 1953 |
| 2,708,617 | Magat | May 17, 1955 |
| 2,755,266 | Brenschede | July 17, 1956 |
| 2,813,775 | Steuber | Nov. 19, 1957 |
| 2,850,467 | Livingood | Sept. 2, 1958 |